United States Patent
Yoshikawa et al.

(10) Patent No.: US 8,690,336 B2
(45) Date of Patent: *Apr. 8, 2014

(54) MOBILE ELECTRONIC DEVICE

(75) Inventors: Jouji Yoshikawa, Kanagawa (JP); Tomoko Asano, Kanagawa (JP); Hiroki Itou, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 181 days.

This patent is subject to a terminal disclaimer.

(21) Appl. No.: 13/260,435

(22) PCT Filed: Mar. 25, 2010

(86) PCT No.: PCT/JP2010/055277
§ 371 (c)(1), (2), (4) Date: Sep. 26, 2011

(87) PCT Pub. No.: WO2010/110390
PCT Pub. Date: Sep. 30, 2010

(65) Prior Publication Data
US 2012/0013857 A1    Jan. 19, 2012

(30) Foreign Application Priority Data
Mar. 26, 2009    (JP) .................. 2009-077780

(51) Int. Cl.
*G03B 31/00*    (2006.01)

(52) U.S. Cl.
USPC ............ 353/15; 353/79; 353/85; 353/100; 353/119; 353/122; 455/556.1; 345/156; 345/158

(58) Field of Classification Search
USPC ........... 353/15, 52–61, 69, 70, 74, 78, 79, 85, 353/100, 119, 122; 356/601–603, 614, 356/623–625; 345/158, 156, 157, 179; 349/5, 7–9; 455/556.1
See application file for complete search history.

(56) References Cited

U.S. PATENT DOCUMENTS

| | | | |
|---|---|---|---|
| 6,775,361 B1 | 8/2004 | Arai et al. | |
| 6,950,126 B1 | 9/2005 | Homma et al. | |
| 7,862,185 B2 * | 1/2011 | Noba | 353/119 |
| 7,926,958 B2 * | 4/2011 | Choi et al. | 353/119 |

(Continued)

FOREIGN PATENT DOCUMENTS

| | | |
|---|---|---|
| JP | 11317793 A | 11/1999 |
| JP | 2000156812 A | 6/2000 |

(Continued)

OTHER PUBLICATIONS

International Search Report of PCT/JP2010/055277 dated Apr. 27, 2010.

(Continued)

*Primary Examiner* — Sultan Chowdhury
(74) *Attorney, Agent, or Firm* — Lowe Hauptman & Ham, LLP

(57) ABSTRACT

A mobile electronic device includes an image projector configured to project an image, a vibration generating unit configured to generate a vibration and adjust an intensity of the vibration, and a control unit configured to control the vibration generator. The control unit is configured to control the vibration generator to adjust the intensity of the vibration based on an image projecting status of the image projector.

18 Claims, 8 Drawing Sheets

(56) References Cited

U.S. PATENT DOCUMENTS

| | | |
|---|---|---|
| 2004/0218738 A1 | 11/2004 | Arai et al. |
| 2005/0088530 A1 | 4/2005 | Homma et al. |
| 2007/0019164 A1* | 1/2007 | Nakagawa et al. ............. 353/20 |
| 2007/0030455 A1 | 2/2007 | Inoue |
| 2008/0055566 A1* | 3/2008 | Yun ................................ 353/82 |
| 2008/0212041 A1 | 9/2008 | Koizumi et al. |
| 2008/0227490 A1 | 9/2008 | Homma et al. |
| 2009/0033880 A1* | 2/2009 | Heo et al. ........................ 353/52 |
| 2009/0036158 A1* | 2/2009 | Fujinawa et al. ........... 455/556.1 |
| 2009/0303176 A1* | 12/2009 | Chen et al. .................... 345/156 |

FOREIGN PATENT DOCUMENTS

| | | |
|---|---|---|
| JP | 2000-333251 | 11/2000 |
| JP | 2004040313 A | 2/2004 |
| JP | 2004289401 A | 10/2004 |
| JP | 2005094496 A | 4/2005 |
| JP | 2006222760 A | 8/2006 |
| JP | 2006-254194 | 9/2006 |
| JP | 2007074652 A | 3/2007 |
| JP | 2008017327 A | 1/2008 |
| JP | 2008-053960 | 3/2008 |
| JP | 2008219256 A | 9/2008 |

OTHER PUBLICATIONS

Office Action issued May 28, 2013 corresponding to Japanese patent application No. 2009-077780.

* cited by examiner

MOBILE ELECTRONIC DEVICE

CROSS-REFERENCE TO RELATED APPLICATION

This application is a National Stage of PCT international application Ser. No. PCT/JP2010/055277 filed on Mar. 25, 2010 which designates the United States, incorporated herein by reference, and which is based upon and claims the benefit of priority from Japanese Patent Application No. 2009-077780.

TECHNICAL FIELD

The present invention relates to a mobile electronic device having an image projector for projecting an image to a screen or to a wall surface.

BACKGROUND ART

As a conventional device for projecting an image to a wall surface or a screen, a so-called projector is used. A mainstream of the projector is a so-called stationary type device which is supplied with power from a commercial power supply and is used when it is fixed to a predetermined location. A projector as the stationary type projects, in its fixed state, an image to a given portion of the wall surface or to the screen.

Recently, on the other hand, a mobile projector compact in size and easy to carry is proposed as the projector. Also proposed as the mobile projector is a mobile phone with a projector function that includes a projector function and, a communication function. In such a mobile phone with the projector function, as a device for notifying an operator of an incoming call when the incoming call is received during using the projector function, there is a device described in Patent Literature 1. Patent Literature 1 also describes a method of notifying an incoming call with a ring tone.

Patent Literature 1 describes a mobile phone with a projector that is provided with a projection unit for projecting an optical image, a communication unit for performing communication with an external device, and a projection control unit for causing the projection unit to start projection indicating a notice such as an incoming call when the incoming call is received by the communication unit during the projection by the projection unit.

Patent Literature 2 and Patent Literature 3 describe methods of projecting an arrival notifying image for notifying the arrival of information to a user-visible projected plane using the projector when the information is received via a communication network, irrespective of whether the mobile phone is being used as the projector.

CITATION LIST

Patent Literature

Patent Literature 1: Japanese Patent Application Laid-open No. 2007-74652
Patent Literature 2: Japanese Patent Application Laid-open No. 2004-289401
Patent Literature 3: Japanese Patent Application Laid-open No. 2005-94496

DISCLOSURE OF INVENTION

Problem to be Solved by the Invention

As a method of notifying an incoming call, in addition to the method of displaying an incoming call on a screen as described in Patent Literature 1, there is a method of notifying an incoming call by causing a vibration generator or a vibrator to vibrate a housing. By notifying the incoming call using the vibrator without causing the projector to project the incoming call, the operator can recognize the incoming call without giving unnecessary information to a third party.

However, if the housing is vibrated during using the projector, the housing moves by the vibration, and a position and a direction of the housing thereby change, which may cause a projection position of an image to unintentionally change. In this manner, if the projection position of the image changes and a position where a light is emitted from the projector changes, the light may be unintentionally irradiated to a person. Because the projector irradiates high-intensity light, if the light irradiated from the projector directly enters person's eyes at a close position, the person may be very dazzled by the irradiated light. In addition, a fan that rotates blades to cool down devices inside the housing, mainly, a light source for the projector also generates a vibration, and therefore the fan has the same problem as above.

It is an object of the present invention to provide a mobile electronic device capable of reducing a possibility that a projection position of an image may unintentionally change.

SUMMARY OF THE INVENTION

According to an aspect of the present invention, a mobile electronic device includes: an image projector that projects an image; a housing that holds the image projector; a vibration generator that vibrates the housing, the vibration generator being capable of adjusting intensity of the vibration; and a control unit that controls an operation of each of the units. The control unit suppresses the vibration according to projection by the image projector.

According to another aspect of the present invention, when the image projector is projecting an image, the control unit controls the vibration generator in such a way that the vibration generated by the vibration generator gets smaller than that when the image projector does not project an image or the vibration generator does not generate the vibration.

According to another aspect of the present invention, when the image projector is projecting an image, the control unit changes the intensity of a vibration generated by the vibration generator to a predetermined value or less.

According to another aspect of the present invention, when the image projector is projecting the image and it is previously detected that the intensity of the vibration generated by the vibration generator reaches the predetermined value or more, the control unit causes the image projector to stop the projection of the image, and then causes the vibration generator to generate a vibration having the intensity of the predetermined value or more.

According to another aspect of the present, invention, the control unit controls the vibration of the vibration generator as a notification operation for notifying a predetermined state. When the image projector is projecting the image and it is previously detected that the intensity of the vibration generated by the vibration generator reaches the predetermined value or more, the control unit controls a notification operation different from the notification operation due to the vibration.

According to another aspect of the present invention, when the vibration is suppressed, the control unit causes the image projector to project a previously set image for notification.

According to another aspect of the present invention, the mobile electronic device further includes a transmitter/receiver that performs communication with other terminal. The vibration generator vibrates the housing in order to notify an incoming call to the transmitter/receiver from the other terminal.

According to another aspect of the present invention, when the image projector is projecting the image, the control unit stops transmission and reception of information by the transmitter/receiver.

According to another aspect of the present invention, the vibration generator includes a cooling fan, and the vibration generator generates the vibration by rotating the cooling fan.

According to another aspect of the present invention, when the image projector is projecting the image, the control unit reduces the number of revolutions of the cooling fan.

According to another aspect of the present invention, the vibration generator includes a speaker, and the vibration generator generates the vibration by driving the speaker.

According to another aspect of the present invention, the control unit calculates the intensity of the vibration generated in the housing based on information for an operation executed by the vibration generator.

According to another aspect of the present invention, the mobile electronic device further includes a vibration detector that detects a vibration occurring in the housing. The control unit calculates the intensity of the vibration occurring in the housing based on a result of detection by the vibration detector.

According to another aspect of the present invention, the mobile electronic device further includes a display unit using a display. When the control unit detects that the display is touched by an operator's finger, the vibration generator vibrates the housing.

Effect of the Invention

The mobile electronic device according to the present invention has advantageous effects that vibration to occur can be kept under a given value and a possibility that a positional displacement of the housing may occur can be reduced.

DESCRIPTION OF EMBODIMENTS

The present invention will be explained in detail below with reference to the drawings. It should be noted that the present invention is not limited by the following explanation. Besides, the components explained in the following include those that can be easily thought of by persons skilled in the art, and substantially equivalents or those in an equivalent scope. A mobile phone as a mobile electronic device will be explained hereinafter as an example, however, an applied target of the present invention is not limited to the mobile phone. The present invention can also be applied to, for example, PHS (Personal Handyphone System), PDA, a portable navigation device, a notebook-size personal computer, and a game machine.

Figure 1:
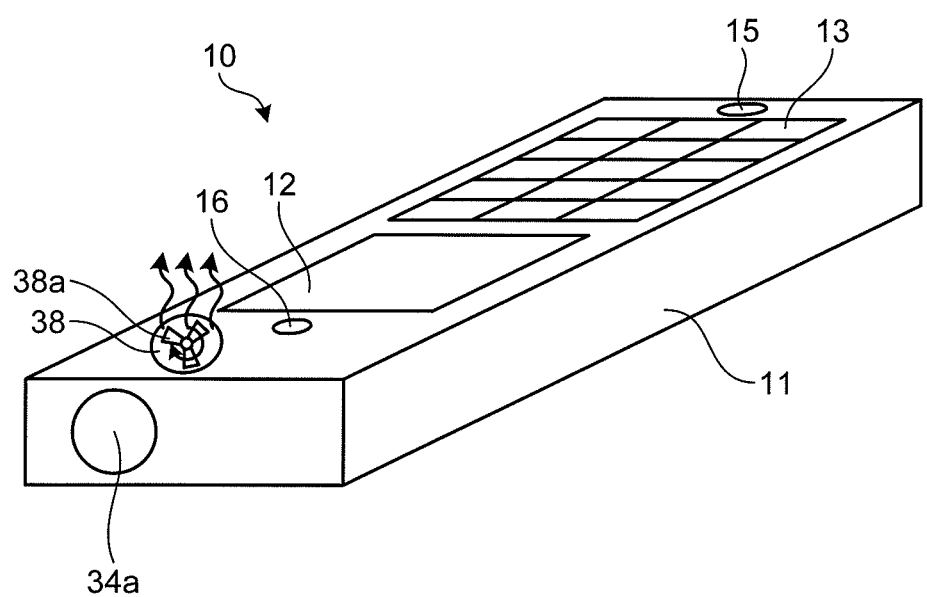
FIG. 1 is a perspective view illustrating a schematic configuration of one embodiment of a mobile electronic device.

First, an external configuration of the mobile electronic device is explained. FIG. 1 is a perspective view illustrating a schematic configuration of one embodiment of the mobile electronic device. A mobile electronic device 10 is a mobile phone provided with a wireless communication function. The mobile electronic device 10 is a straight mobile phone with units stored inside of one box-shaped housing 11. In the present invention, the housing 11 is formed to a box shape, however, the housing may be formed with two members coupled to each other by a hinge and thereby be foldable, or the housing may be configured to have two members which are slidable. A housing connected with three or more members can also be used.

The housing 11 is provided with a display 12 as a display unit illustrated in FIG. 1. The display 12 displays a predetermined image, such as a standby image when the mobile electronic device 10 is in a standby state for waiting for reception and a menu image used to help operation of the mobile electronic device 10.

The housing 11 is provided with a plurality of operation keys 13 used to enter a telephone number of an intended party or to enter text when mail is created or so. The operation keys 13 constitute an operating unit 28 (see FIG. 2) of the mobile electronic device 10. The housing 11 is also provided with a microphone 15 that receives voice during talking on the mobile electronic device 10, a receiver 16 that emits voice during talking on the mobile electronic device 10, and a cooling fan 38 that lets the heat inside the housing 11 escape.

A light emitting portion 34a of the projector 34 for projecting an image is provided on a top face of the housing 11 (one side, of one of four faces orthogonal to a face where the operation keys 13 are provided, is the short side close to the receiver 16).

Figure 2:
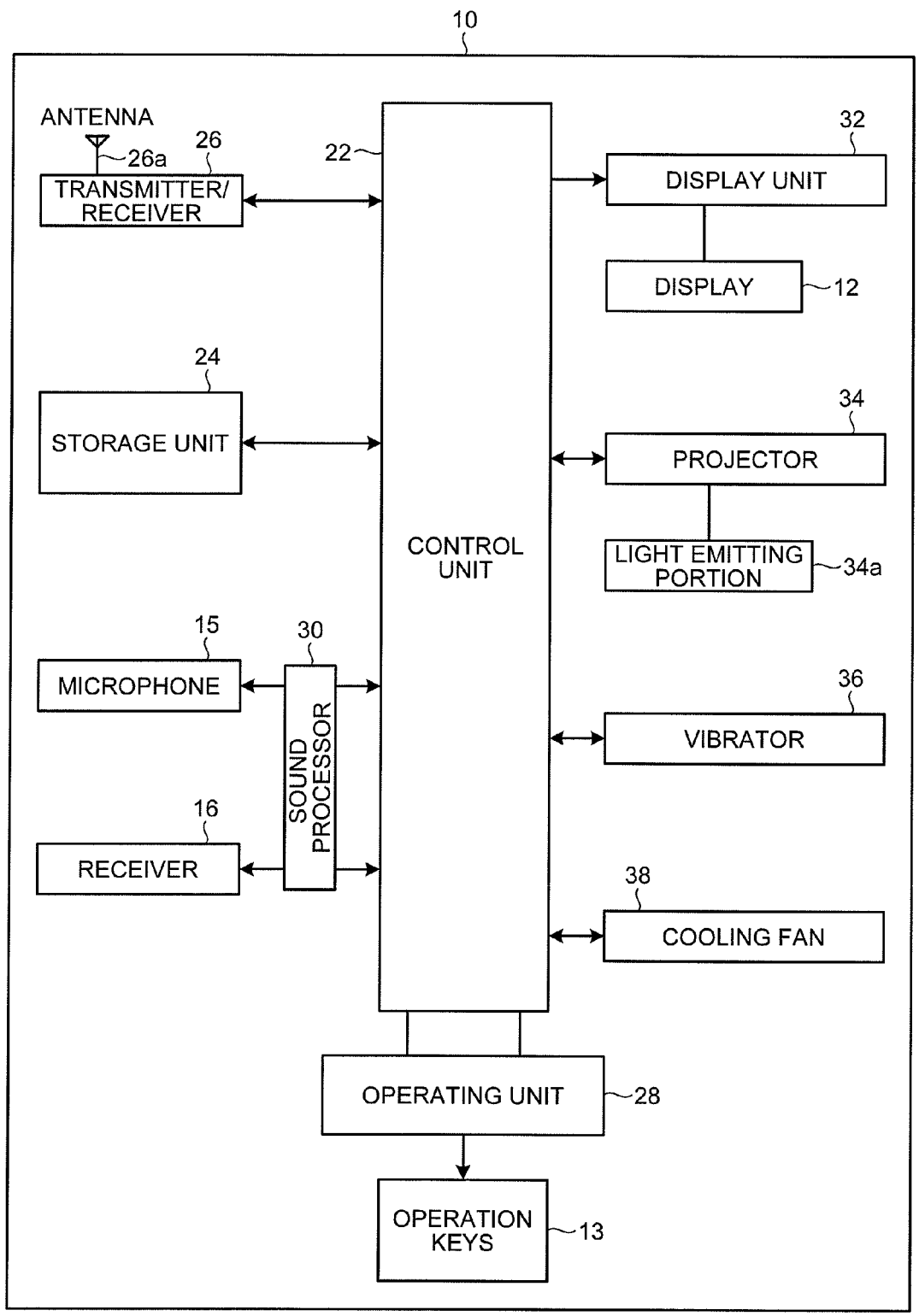
FIG. 2 is a block diagram of the schematic configuration of the mobile electronic device as illustrated in FIG. 1.

FIG. 2 is a block diagram illustrating the schematic configuration of functions of the mobile electronic device as illustrated in FIG. 1. The mobile electronic device 10 as illustrated in FIG. 2 includes a control unit 22, a storage unit 24, a transmitter/receiver 26, an operating unit 28, a sound processor 30, a display unit 32, the projector 34, a vibrator 36, and the cooling fan 38.

The control unit 22 is a processor such as a CPU (central processing unit) that integrally controls an overall operation of the mobile electronic device 10. That is, the control unit 22 controls the operations of the transmitter/receiver 26, the sound processor 30, and the display unit 32 or the like so that the various processes of the mobile electronic device 10 are executed in an appropriate sequence according to the operation of the operating unit 28 and software stored in the storage unit 24 of the mobile electronic device 10. The various processes of the mobile electronic device 10 include, for example, voice communication performed through a line switching network, creation and transmission/reception of an electronic mail, and browsing to a Web (World Wide Web) site on the Internet. In addition, the operations of the transmitter/receiver 26, the sound processor 30, and the display unit 32 or the like include signal transmission/reception by the transmitter/receiver 26, voice input/output by the sound processor 30, and display of an image by the display unit 32.

The control unit 22 executes processes based on programs (e.g., operating system program and application programs) stored in the storage unit 24. The control unit 22 is formed with, for example, a MPU (Micro Processing Unit), and executes the various processes of the mobile electronic device 10 according to the sequence instructed by the software. That is, the control unit 22 sequentially loads operation codes from the operating system program and the application programs stored in the storage unit 24, and executes the processes.

The control unit 22 has a function of executing a plurality of application programs. The application program executed by the control unit 22 includes a plurality of application programs such as an application program for controlling the drive of the projector, image reproducing application programs for reproducing still images and moving images, and game application programs for activating various games.

The storage unit 24 stores therein software and data used for processes performed by the control unit 22, that is, a task for activating the application program that controls the drive of the projector, a task for activating the image reproducing application programs that reproduce still images and moving images, and a task for activating the various game application programs.

The storage unit 24 stores therein, in addition to these tasks, for example, voice data through communication and downloaded voice data, or software used by the control unit 22 for controlling the storage unit 24, and telephone numbers and email addresses of communication opposite parties, and also stores therein addresses to be managed, a sound file of a dial tone and a ring tone or the like, temporary data used for a process of software. The computer programs and the temporary data used for the processes of the software are temporarily stored in a work area allocated to the storage unit 24 by the control unit 22. The storage unit 24 is formed with, for example, a nonvolatile storage device (e.g., nonvolatile semiconductor memory such as ROM: Read Only Memory, and a hard disk drive), and a readable/writable storage device (e.g., SRAM: Static Random Access Memory, and DRAM: Dynamic Random Access Memory).

The transmitter/receiver 26 includes an antenna 26a, and establishes a wireless signal line based on CDMA system with a base station through a channel allocated by the base station, and performs telephone communication and information communication with a base station.

The operating unit 28 is formed with the operation keys 13 such as Power key, Talk key, Numeric keys, Character keys, Direction key, OK key, and Send key to which various functions are allocated respectively. When these keys are used to enter information through the user operation, the operating unit 28 emits a signal corresponding to the content of the operation. The emitted signal is input to the control unit 22 as an user instruction.

The sound processor 30 executes processes of a voice signal input to the microphone 15 and a voice signal output from the receiver 16. In other words, the sound processor 30 amplifies the voice input through the microphone 15, subjects the voice to AD conversion (Analog to Digital conversion), then further subjects the voice to signal processing such as coding, converts the coded voice to digital voice data, and outputs the digital voice data to the control unit 22. Moreover, the sound processor 30 decodes the voice data sent from the control unit 22, subjects the decoded data to DA conversion (Digital to Analog conversion), subjects the converted data to processes such as amplification to be converted to an analog voice signal, and outputs the analog voice signal to the receiver 16. The mobile electronic device 10 further includes a speaker, and the sound processor 30 also causes the speaker to output sound. Output from the speaker are sound notifying an incoming call, voice during the hands-free operation, music and the like.

The display unit 32 is provided with a display panel (such as the display 12) formed with a LCD (Liquid Crystal Display) or an organic EL (Electro-Luminescence) panel or the like, and displays a video image according to video data supplied from the control unit 22 and an image according to image data on the display panel. The display unit 32 may be provided with, for example, a sub-display at a location that is exposed to the outside even when the housing is closed, in addition to the display 12.

Figure 3:
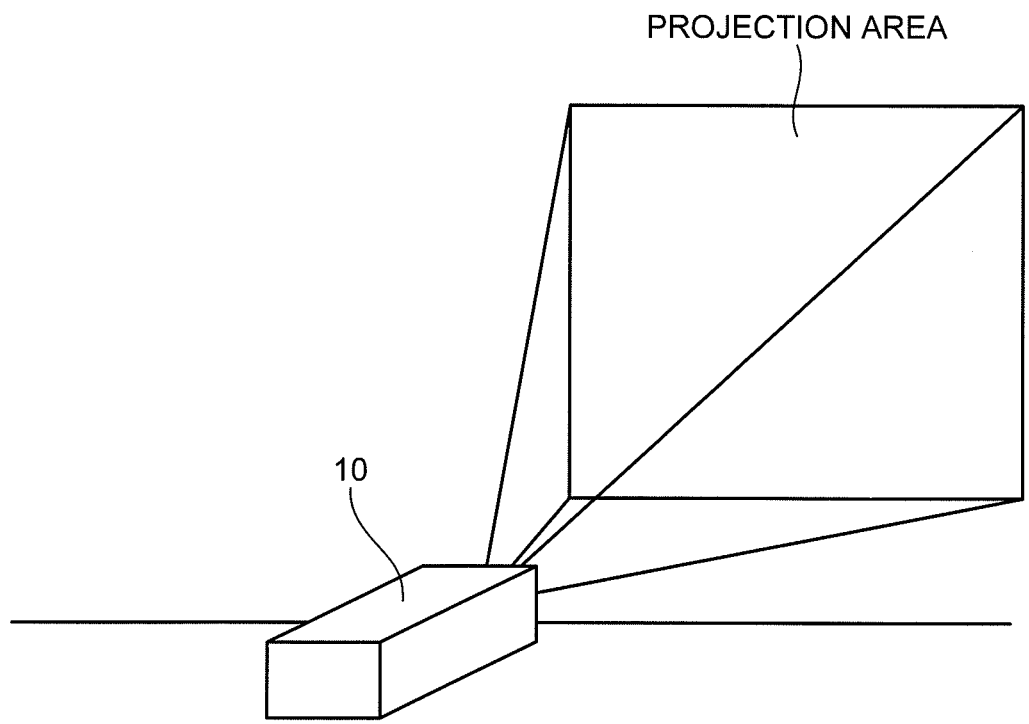
FIG. 3 is an explanatory diagram illustrating a state in which an image is displayed by the mobile electronic device as illustrated in FIG. 1.

The projector 34 is an image projection mechanism for projecting an image, and, as explained above, is provided with the light emitting portion 34a for projecting an image, on the top face of the housing 11. FIG. 3 is an explanatory diagram illustrating a state in which an image is displayed by the mobile electronic device as illustrated in FIG. 1. The mobile electronic device 10 projects an image from the light emitting portion 34a of the projector 34. In other words, by emitting the light forming the image, as illustrated in FIG. 3, an image can be projected to a given area (projection area) of a wall surface or a screen on a plane opposite to the top face of the housing 11. The operation of projector 34 is controlled by the control unit 22, so that various video images such as films and presentation materials sent from the control unit 22 are projected and displayed on the projection area.

The projector 34 is formed with a light source and an optical system that switches whether the light emitted from the light source is projected, according to the image data. For example, a projector configured with a halogen light, a LED light source, or an LD light source as the light source and with an LCD (Liquid Crystal Display) or a DMD (Digital Micromirror Device) as the optical system can be used as the projector 34. In this case, the optical system is provided over the whole area of the projection area corresponding to pixels, and the optical system is turned on or off by synchronizing the light 30, emitted from the light source with the image, so that the image can be projected over the whole area of the projection area. A projector configured with a light source that emits laser light, and with an optical system that includes a switching element for switching whether the light emitted from the light source is to be transmitted and a mirror for subjecting the light having passed through the switching element to raster scanning can be used as the projector 34. In this case, by changing an angle of the light emitted from the laser light by the mirror and scanning the light irradiated from the light source over the whole area of the projection area, the image can be projected to the projection area.

The vibrator 36 is a vibration generation mechanism that is provided inside the housing 11 and vibrates the housing 11. As the vibration generation mechanism, an eccentric motor can be used. The vibrator 36 is driven by the control of the control unit 22, and vibrates the housing 11 upon notification of an incoming call from other terminal, upon notification of arrival of a notice such as E-mail, C-mail (Short Message Service), or Short Mail, and upon using an alarm function. The vibrator 36 can set mode to a plurality of vibration modes, so that the housing 11 can be vibrated at various intensities according to the setting.

The cooling fan 38 is a cooling mechanism that cools the units disposed inside the housing 11, especially, the light emitting portion of the projector 34. The cooling fan 38 is formed with blades 38a that rotate to circulate the air, a motor that rotates the blades 38a, and the like. By cooling the units disposed inside the housing 11, the cooling fan 38 prevents the mobile electronic device 10 from its failure due to over-heat or from its excessive power consumption. In order to improve cooling efficiency of the cooling fan 38, the mobile electronic device 10 may further be provided with a heatsink or the like in an area where the air is circulated by the fan. The mobile electronic device 10 is configured basically as above.

Figure 4:
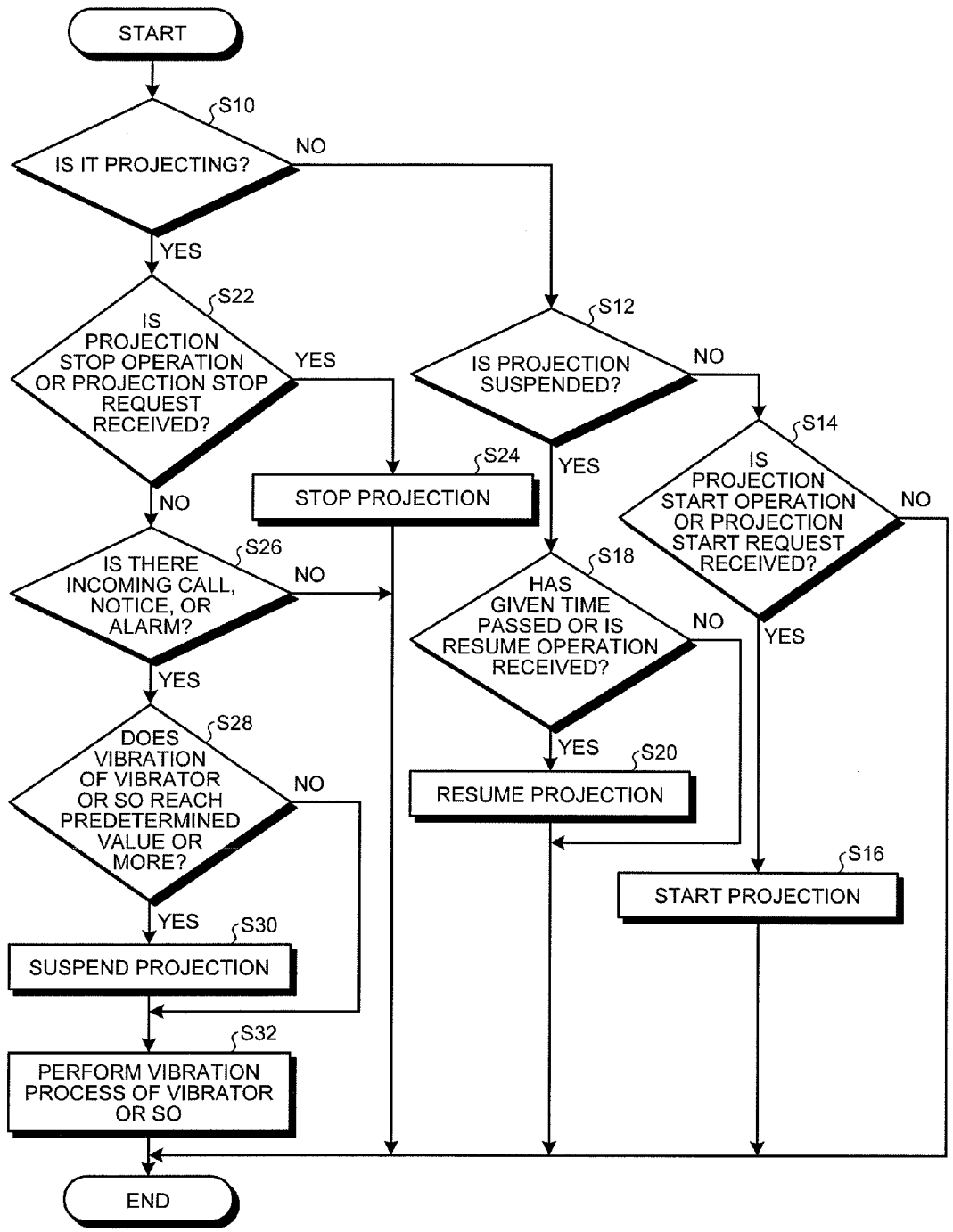
FIG. 4 is a flowchart illustrating one example of the operation of the mobile electronic device.

Next, an image displaying/projecting operation of the mobile electronic device 10, specifically, the processing operation in the control unit 22 and the control operation of the projector 34 will be explained with reference to FIG. 4. FIG. 4 is a flowchart illustrating one example of the operation of the mobile electronic device. The flowchart illustrated in FIG. 4 represents the processing operation performed when an incoming call, a notice, an alarm, or the like is input as interrupt processing during image projection by the projector 34. The application program executed by the control unit 22 for driving the projector is set up with processes performed when an incoming call, a notice, or an alarm is received as the interrupt processing.

First, the control unit 22 of the mobile electronic device 10 determines whether it is projecting as Step S10. In other words, the control unit 22 determines whether the task for activating the application program that controls the drive of the projector is read from the storage unit 24, the application program for driving the projector 34 is driven (executed), light is emitted from the projector 34, and an image is projected to the projection area.

When it is determined at Step S10 that it is not projecting (No), the control unit 22 determines whether the projection is suspended as Step S12. In other words, the control unit 22 determines whether the projector 34 temporarily stops projection although it is driven. When it is determined at Step S12 that the projection is not suspended (No), the control unit 22 determines whether a projection start operation or a projection start request is received as Step S14. In other words, the control unit 22 determines whether an instruction to start projection input by the operator or a request to start projection generated through the process based on the setting of the program is received. When it is determined at Step S14 that the projection start operation or the projection start request is received (Yes), the control unit 22 starts projection as Step S16. In other words, when it is determined from Step S10 to Step S14 that the image projection is not going on nor suspended but the operation or the request to start projection of the image is received, the control unit 22 emits light from the projector 34, and starts projecting the image. After starting the projection of the image at Step S16, the control unit 22 ends the process. When it is determined at Step S14 that both the projection start operation and the projection start request are not received (No), the control unit 22 ends the process. In other words, when it is determined from Step S10 to Step S14 that the image projection is not going on nor suspended and the operation or the request to start projection of the image is not received, the control unit 22 ends the process without operation for image projection.

Next, when it is determined at Step S12 that the projection is suspended (Yes), the control unit 22 determines whether a given time has passed or a resuming operation is received, as Step S18. In other words, when the projection is suspended, the control unit 22 determines whether a given time (preset time) has passed since the suspension of the image projection by the projector 34 or an instruction to resume the operation is input by the operator. When it is determined at Step S18 that the given time has passed or the resuming operation is received (Yes), the control unit 22 resumes image projection by the projector 34 as Step S20, and thereafter ends the process. It should be noted that even if the process is ended, the operation of image projection by the projector 34 is continued. When it is determined at Step S18 that the given time has not passed and the resuming operation is not received (No), the control unit 22 ends the process without resuming the image projection by the projector 34.

Next, when it is determined at Step S10 that it is projecting (Yes), the control unit 22 determines whether a projection stop operation or a projection stop request is received, as Step S22. In other words, the control unit 22 determines whether an instruction to stop projection input by the operator or a request to stop projection generated through the process based on the setting of the program is received. When it is determined at Step S22 that the projection stop operation or the projection stop request is received (Yes), the control unit 22 stops the image projection by the projector 34 as Step S24, and ends the process.

When it is determined at Step S22 that both the projection stop operation and the projection stop request are not received (No), the control unit 22 determines whether there is an incoming call, a notice, is an alarm as Step S26. In other words, the control unit 22 determines whether a signal notifying an incoming call from other terminal or a notice such as mail is received from a base station or the like, or it is a state in which an alarm should be output (e.g., it is a time to output an alarm). When it is determined at Step S26 that there are no incoming call, no notice, and no alarm (No), that is, when the incoming call and the notice are not notified and the alarm should not be output, the control unit 22 ends the process without any change. It should be noted that even if the process is ended, the operation of image projection by the projector 34 is continued.

When it is determined at Step S26 that it is the state that the incoming call, the notice, or the alarm should be output (Yes), that is, at least one of notification of the incoming call, notification of the notice, and output of the alarm needs to be performed, the control unit 22 determines whether the vibration of the vibrator or the like reaches the predetermined value or more as Step S28. In other words, the control unit 22 determines whether the vibration caused by the operations for notifications of the incoming call and of the notice or for output of the alarm becomes a value or more that is set as an allowable range. Here, the operations for notifications of the incoming call and of the notice or for output of the alarm include an operation of the vibrator 36 that vibrates the housing 11, a vibration caused by an output of sounds from the receiver or the speaker, and the like. In addition, the control unit 22 determines whether the vibration occurring upon the operations reaches the predetermined value or more, including vibration occurring from a function used for any operation other than the operations at the time of executing the operations for performing notifications of the incoming call and the notice and performing output of the alarm, for example, including vibration occurring caused by the drive of the cooling fan 38. The allowable range of the vibration represents a range in which it can be determined that a displacement of the housing 11 due to the vibration does not exceed a given distance and a given direction. The vibration of the housing 11 may be detected by detecting a drive signal for driving the vibrator 36, that is, detecting a degree of vibration that are being generated by the vibrator 36.

When it is determined at Step S28 that the vibration reaches the predetermined value or more (Yes), the control unit 22 suspends the projection operation as Step S30 and then proceeds to Step S32, while when it is determined at Step S28 that the vibration does not reach the predetermined value or more (No), that is, the vibration to occur is less than the predetermined value, the control unit 22 proceeds to Step S32 without any change.

The control unit 22 performs the vibration process of the vibrator as Step S32. In other words, the control unit 22 performs the operation determined at Step S26 that it is executed, and generates a given vibration in the housing 11. After the process at Step S32 is performed, the control unit 22 ends the process. The control unit 22 repeats the processes during driving of the projector 34. In other words, during driving of the projector 34, the control unit 22 terminates the processes at Step S14, Step S16, Step S18, Step S20, Step S24, Step S26, and Step S32, then again proceeds to Step S10, and repeats the processes.

In this manner, when detecting that the vibration of the predetermined value or more will occur in the housing 11, the mobile electronic device 10 stops image projection by the projector 34, and then generates the vibration. Therefore, it is possible to prevent that the direction of the housing 11 changes by the vibration and the light is thereby irradiated in an unexpected direction during image projection by the projector 34. In other words, by adjusting a generation of vibration (specifically, by suppressing vibration), when it is required, according to the status of the projector (projection status of the image), the movement of the housing can be prevented. This allows reduction in the possibility that the light is unintentionally irradiated to a person and also reduction in the possibility that the person is dazzled by the irradiated light. This makes it possible to enhance the safety, thus achieving a user-friendly mobile electronic device.

In the present embodiment, a notice such as an incoming call and a generation of an alarm are notified by the operation of the vibrator 36, which enables to notify the operator of the information without a third party knowing about the content thereof.

In the embodiment, it is determined at Step S18 whether the projection is resumed based on both the elapsed time and the presence or absence of input from the operating unit, however, the present invention is not limited thereto. It may be determined based on only one of the elapsed time and the presence or absence of input from the operating unit. It may also be determined whether the projection is resumed based on the status of the control unit 22, for example, based on whether the processing operation of suspending the projection is terminated, or the projection is in its standby status.

In the embodiment, it is determined at Step S28 whether the vibration reaches the predetermined value or more based on the signal for driving the vibrator 36. However, a vibration detection sensor for detecting vibration of the housing 11 may be used to determine whether a detected value by the vibration detection sensor is a predetermined value or more. In this case, when the detected value reaches the predetermined value or more, then the projection of an image by the projector 34 should be suspended.

Figure 5:
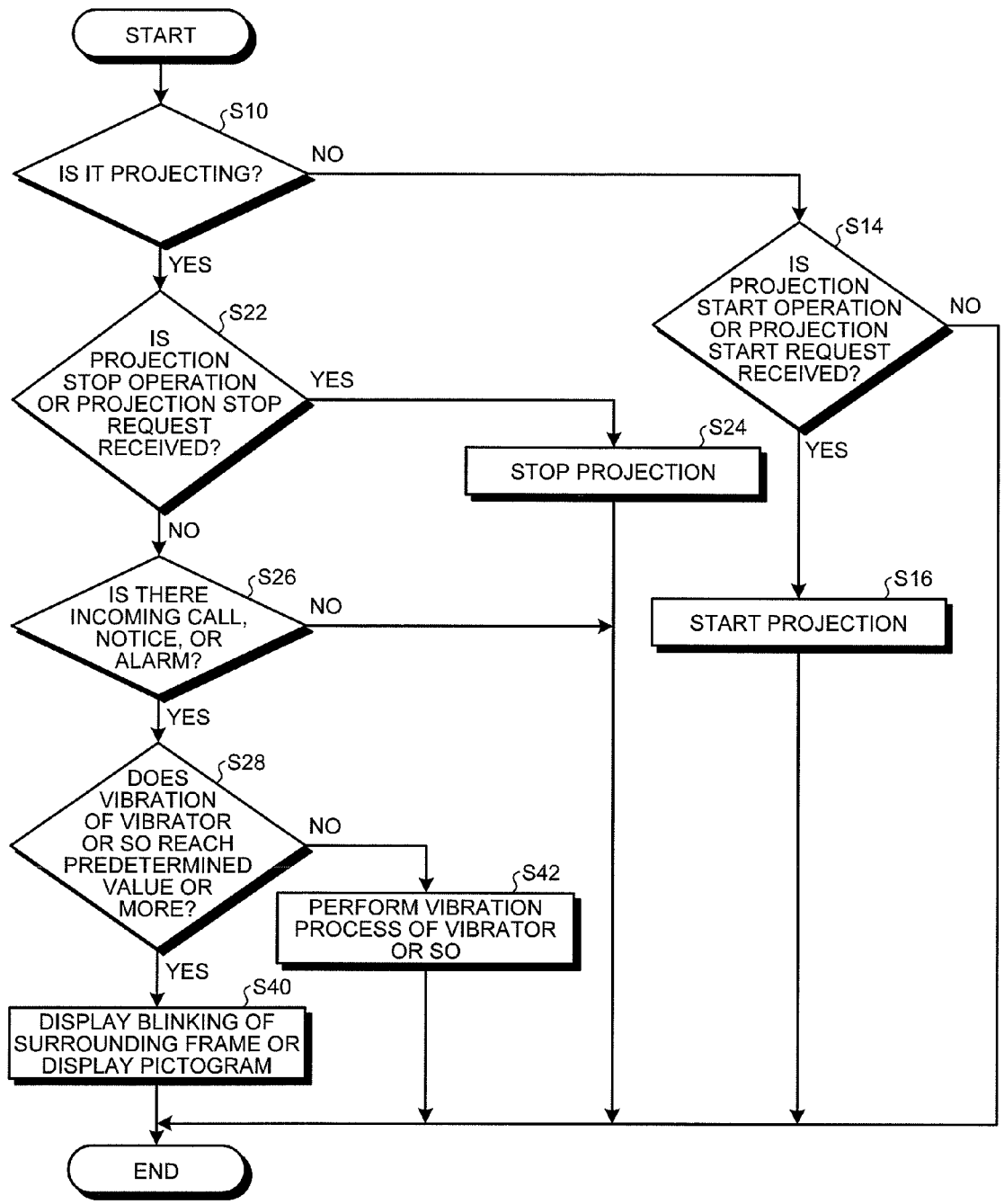
FIG. 5 is a flowchart illustrating another example of the operation of the mobile electronic device.

In the flowchart illustrated in FIG. 4, when it is determined at Step S28 that the vibration of the vibrator reaches the predetermined value or more, the image projection by the projector 34 is suspended as Step S30. However, the operation of the present invention is not limited thereto. Another example of the operation of the mobile electronic device 10 will be explained below with reference to FIG. 5. FIG. 5 is a flowchart illustrating another example of the operation of the mobile electronic device. The flowchart illustrated in FIG. 5 also represents a processing operation when an incoming call, a notice, an alarm, or the like is received as an interrupt processing during image projection by the projector 34. Here, the flowchart illustrated in FIG. 5 includes some operations same as that in the flowchart illustrated in FIG. 4. Therefore, the same step numbers are allocated to the same operations as these in the flowchart illustrated in FIG. 4, and detailed explanation thereof is omitted. The operations specific to the flowchart illustrated in FIG. 5 will be mainly explained below.

First, the control unit 22 of the mobile electronic device 10 determines whether it is projecting as Step S10. When it is determined at Step S10 that it is not projecting (No), the control unit 22 determines whether a projection start operation or a projection start request is received, as Step S14. When it is determined at Step S14 that the projection start operation or the projection start request is received (Yes), the control unit 22 starts projection as Step S16. When it is determined at Step S14 that both the projection start operation and the projection start request are not received (No), the control unit 22 ends the process.

Next, when it is determined at Step S10 that it is projecting (Yes), the control unit 22 determines whether a projection stop operation or a projection stop request is received, as Step S22. When it is determined at Step S22 that the projection stop operation or the projection stop request is received (Yes), the control unit 22 stops image projection by the projector 34 as Step S24, and ends the process.

When it is determined at Step S22 that both the projection stop operation and the projection stop request are not received (No), the control unit 22 determines whether there is an incoming call, a notice, or an alarm, as Step S26. When it is determined at Step S26 that there are no incoming call, no notice, and no alarm (No), that is, when there are no incoming call and no notice and it is the state where the alarm should not be output, the control unit 22 ends the process without any change.

When it is determined at Step S26 that it is the state where the incoming call, the notice, or the alarm should be output (Yes), that is, when it is determined that at least one of the notification of the incoming call, the notification of the notice, and the output of the alarm needs to be performed, the control unit 22 determines whether the vibration of the vibrator or the like reaches the predetermined value or more.

When it is determined at Step S28 that the vibration reaches the predetermined value or more (Yes), the control unit 22 displays blinking of a surrounding frame or displays a pictogram as Step S40. In other words, instead of the notification by generating the vibration of the predetermined value or more, the control unit 22 makes the similar notification by blinking the surrounding frame of the image projected by the projector 34 or by projecting a pictogram or a simple image on a part of the projected image. The control unit 22 may display the notification on the display 12 as necessary.

When it is determined at Step S28 that the vibration does not reach the predetermined value or more (No), that is, vibration to occur is less than the predetermined value, the control unit 22 performs a vibration process of the vibrator or the like as Step S42. In other words, the control unit 22 performs the operation determined at Step S26 that it is executed and generates a given vibration of the housing 11. After performing the process at Step S42, the control unit 22 ends the process. The control unit 22 repeats the processes during driving of the projector 34. In other words, during driving of the projector 34, after terminating the processes at Step S14, Step S16, Step S24, Step S26, Step S40 and Step S42, the control unit 22 again proceeds to Step S10, and repeats the processes.

In this manner, when it is detected that a vibration of the predetermined value or more will occur in the housing 11, the mobile electronic device 10 makes its notification by the image projected by the projector 34 instead of the vibration of the housing 11. Therefore, it is possible to prevent the change in the direction of the housing 11 due to the vibration and the irradiation of the light in an unexpected direction during image projection by the projector 34. This allows reduction in the possibility that the light is unintentionally irradiated to a person and also reduction in the possibility that the person is dazzled by the irradiated light. This makes it possible to enhance the safety, thus achieving a user-friendly mobile electronic device.

When the vibration occurring in the housing 11 is less than the predetermined value, a notice such as an incoming call and a generation of an alarm are notified by the operation of the vibrator 36, which enables to notify the operator of the information without a third party knowing about the content thereof. In addition, when the notification is displayed on the image projected by the projector 34, the blinking of the frame or the pictogram display are used, which enables to notify the operator of the information without a third party knowing about the content thereof or only by letting a third party know less information.

Here, when an image is to be projected by the projector, by switching between displays as illustrated in the following Table 1, it is possible to let the operator know about what kind of notification is received.

and in the case of Alarm 2, the frame is made to alternately blink in two colors, blue and white, for one second.

In this way, by switching the displayed frames to one another depending on information to be notified, the operator can get to know the type of notified information from the display of the frame. In Table 1, an other-party display is notified, however, to further enhance secrecy, it should not be displayed. Moreover, if the information for the other party is not displayed, the incoming call or the like can be notified to a portion other than the frame without projection of the image thereto. The embodiment is configured to display the information on the display by the setting, however, the setting to display it on the display may not be used.

Figure 6:
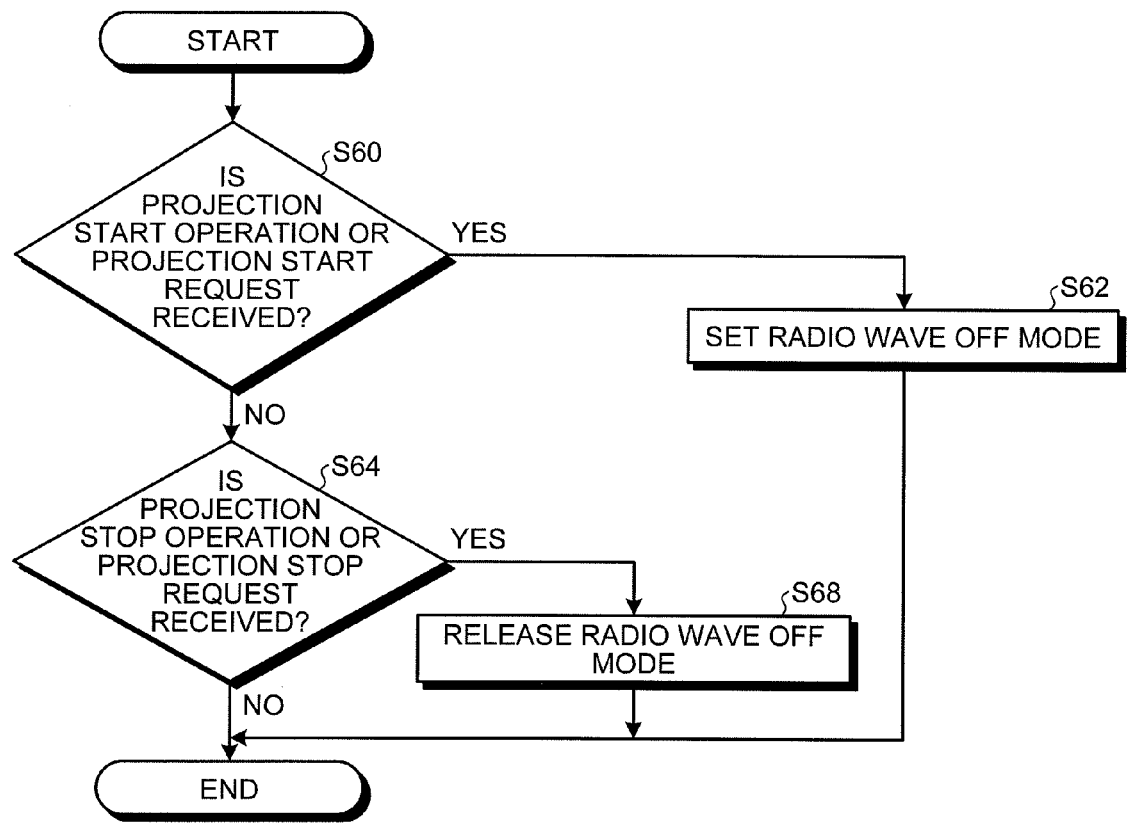
FIG. 6 is a flowchart illustrating another example of the operation of the mobile electronic device.

The embodiment is configured so that control is provided based on a vibration when the vibration needs to be generated, however, the present invention is not limited thereto. Therefore, it may be set that the vibration is automatically prevented from its occurrence in response to detection that image projection by the projector 34 will be started. The setting will be specifically explained with reference to FIG. 6. FIG. 6 is a flowchart illustrating another example of the operation of the

TABLE 1

| INTERRUPT FUNCTION | TYPE | DISPLAY SETTING | OTHER-PARTY DISPLAY | DISPLAY MODE |
| --- | --- | --- | --- | --- |
| INCOMING CALL | USUAL CALLER | PROJECTOR | DISPLAYED | WHITE/BLACK FRAME BLINK 1 sec. |
| INCOMING CALL | REGISTERED CALLER 1 | PROJECTOR | NOT DISPLAYED | RED/WHITE FRAME BLINK 1 sec. |
| INCOMING CALL | REGISTERED CALLER 2 | DISPLAY | — | — |
| MAIL | E-MAIL | PROJECTOR | DISPLAYED | WHITE/BLACK FRAME BLINK 2 sec. |
| MAIL | C-MAIL | PROJECTOR | DISPLAYED | RED/WHITE FRAME BLINK 2 sec. |
| ALARM | ALARM 1 | PROJECTOR | — | RED/YELLOW FRAME BLINK 1 sec. |
| ALARM | ALARM 2 | PROJECTOR | — | BLUE/WHITE FRAME BLINK 1 sec. |

In the example illustrated in Table 1, even if the incoming call is to be notified, displayed images are switched to one another depending on whether a caller on the phone is Registered caller 1, Registered caller 2, or Other usual caller. Specifically, in the case of the usual caller, a frame is made to alternately blink in two colors, white and black, for one second, and the phone number of the caller is displayed. Next, in the case of Registered caller 1, the frame is made to alternately blink in two colors, red and white, for one second, and the phone number of the caller is not displayed. Furthermore, in the case of Registered caller 2, the notification is not displayed on the projector 34 but displayed only on the display 12. In the case where arrival of mail is to be notified, displayed images are switched to one another depending on whether the mail is E-mail or C-mail. Specifically, in the case of the E-mail, the frame is made to alternately blink in two colors, white and black, for two seconds, and the information, such as address, for the other party who has sent the mail is displayed. In the case of the C-mail, the frame is made to alternately blink in two colors, red and white, for two seconds, and the information, such as address, for the other party who has sent the mail is displayed. Furthermore, when alarm is to be generated, displayed images are switched to one another depending on whether the alarm is Alarm 1 or Alarm 2. Specifically, in the case of Alarm 1, the frame is made to alternately blink in two colors, red and yellow, for one second, mobile electronic device. The processes in FIG. 6 are separately performed in parallel to the operation of the image projection by the projector 34. First, the control unit 22 determines whether a projection start operation or a projection start request is received as Step S60. In other words, the control unit 22 determines whether an instruction to start projection input by the operator is received or a request to start projection generated through the process based on the setting of the program is received. When it is determined at Step S60 that the projection start operation or the projection start request is received (Yes), the control unit 22 sets the mode to a radio wave off mode as Step S62. In other words, the control unit 22 stops the function of the transmitter/receiver 26, so that incoming calls and mails are prevented from their reception from other terminals or base stations. When the radio wave off mode is set, the control unit 22 ends the process.

When it is determined at Step S60 that both the projection start operation and the projection start request are not received (No), the control unit 22 determines whether a projection stop operation or a projection stop request is received, as Step S64. In other words, the control unit 22 determines whether an instruction to stop projection input by the operator or a request to stop projection generated through the process based on the setting of the program is received. When it is determined at Step S64 that both the projection stop operation and the projection stop request are not received (No), the control unit 22 ends the process without any change. When it is determined at Step S64 that the projection stop operation or the projection stop request is received (Yes), the control unit 22 releases the radio wave off mode as Step S68, and ends the process. In other words, the control unit 22 activates the function of the transmitter/receiver 26 at Step S68, to set a state where incoming calls and mails can be received, and then ends the process.

In this manner, by setting so as not to receive incoming calls and mails during image projection by the projector 34, it is possible to prevent the occurrence of a vibration of a given value or more in the housing 11, thus obtaining the same effect as that of the above mentioned embodiment. According to the present embodiment, the image projection can be performed by the projector 34 without projecting another image or suspending the image projection.

In the flowchart illustrated in FIG. 6, the radio wave off mode is set, however, the setting is not limited thereto. Therefore, a mode in which no vibration is generated by the vibrator 36 and no sound is output from the receiver or the speaker even if an incoming call or the like is received, a so-called silent mode may be set. In the case of the above setting, the alarm function is also preferably set so that the vibrator 36 does not generate the vibration.

In the flowcharts illustrated in FIG. 4 to FIG. 6, the case where incoming call is received, mail is received, or alarm is generated during image projection by the projector 34 has been mainly explained, however, the same control as above can be provided to the continuously driven cooling fan 38. When the cooling fan 38 is driven, the number of revolutions and an output of the projector 34 being a heat generating source may be adjusted.

Figure 7:
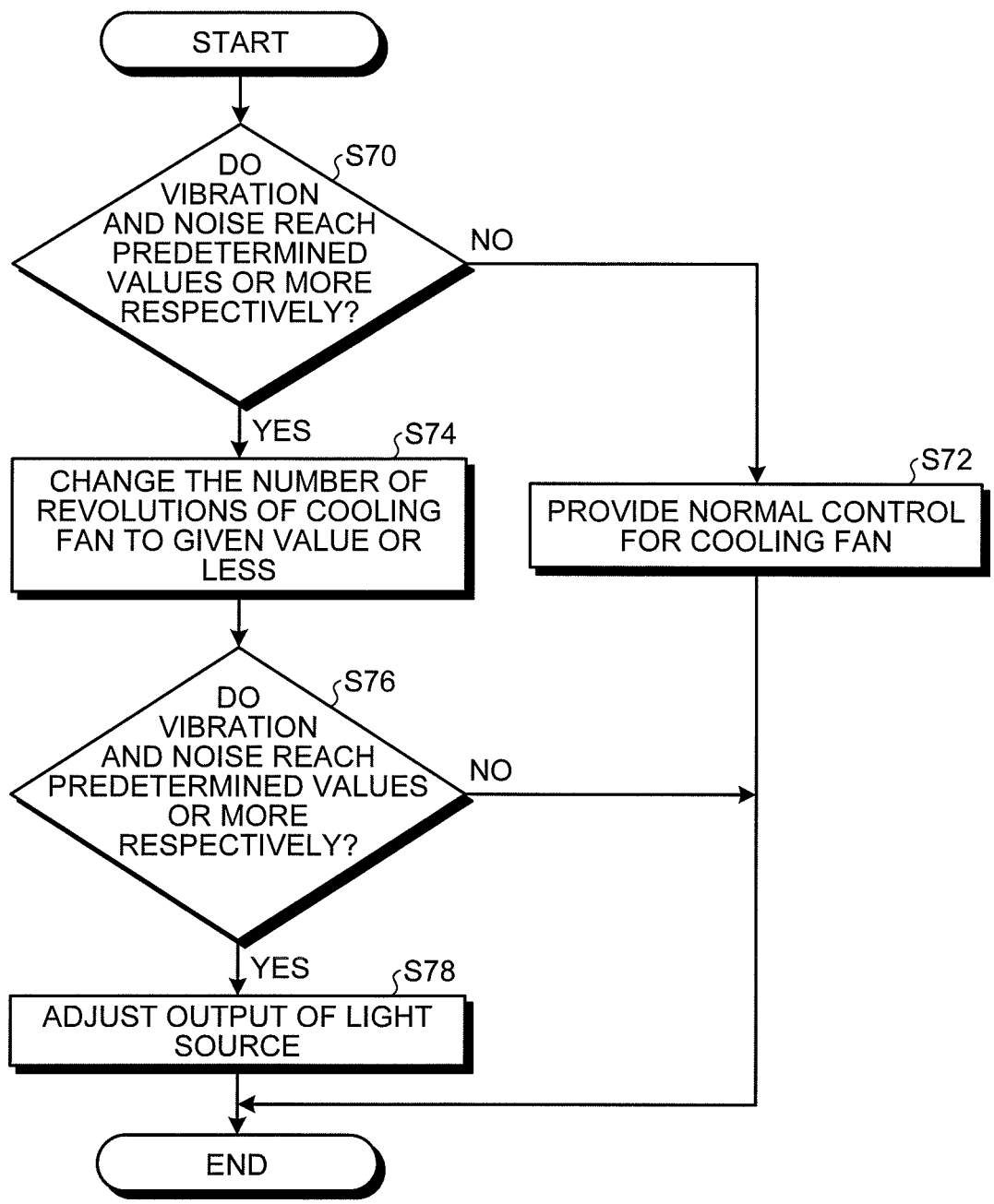
FIG. 7 is a flowchart illustrating another example of the operation of the mobile electronic device.

The control for the operation of the cooling fan 38 will be explained below with reference to FIG. 7. FIG. 7 is a flowchart illustrating another example of the operation of the mobile electronic device. The mobile electronic device that provides control in the flowchart illustrated in FIG. 7 includes a noise detection sensor that detects noise and a vibration detection sensor that detects a vibration of the housing 11. First, the control unit 22 determines whether the noise and the vibration reach predetermined values or more respectively, as Step S70. Here, the noise is a sound produced by a rotation of the cooling fan 38, and the vibration occurs in the housing 11 due to a rotation of the cooling fan 38. The predetermined value or more of the noise represents a sound of a preset value or more. For example, this is a case where the sound becomes greater than speech output during using the projector 34. The predetermined value or more of the vibration represents a vibration with which the housing 11 can be moved or rotated a given value or more. The noise is detected by the noise detection sensor and the vibration is detected by the vibration detection sensor.

When it is determined at Step S70 that both the noise and the vibration do not reach the predetermined values or more (No), that is, both are less than the predetermined values, the control unit 22 provides normal control for the cooling fan as Step S72, and ends the process. In other words, images are continuously projected from the projector 34 while the cooling fan 38 is made to rotate without changing conditions. When it is determined at Step S70 that either one of the noise and the vibration reaches the predetermined value or more (Yes), the control unit 22 changes the number of revolutions of the cooling fan 38 to a given value or less. In other words, the control unit 22 changes the number of revolutions of the cooling fan 38 to the predetermined number of revolutions so that the noise and the vibration become less than the predetermined values respectively. In order to change the number of revolutions of the cooling fan 38 to the predetermined value or less, the number of revolutions may be changed to a given rotation that is previously set. When the number of revolutions is changed to the given rotation that is previously set, the control is easy. Moreover, the number of revolutions as critical values in which the vibration and the noise become less than the predetermined values are detected upon activation and execution of the projector, and the number of revolutions may be changed to the critical number of revolutions. Here, the critical number of revolutions is different in a case where the mobile electronic device is placed right (directly) on a hard desk from a case where it is placed on a desk covered with a soft cloth. Therefore, by changing the number of revolutions to the critical number of revolutions, this enables us to obtain such an advantage that it can be changed to an optimal number of revolutions each time according to the situation of the projector.

When the number of revolutions of the cooling fan 38 is changed to the given value or less at Step S74, the control unit 22 determines whether the noise and the vibration reach the predetermined values or more respectively as Step S76. The predetermined values are the same as the predetermined values used at Step S70 respectively. In other words, the control unit 22 determines whether the noise and the vibration become less than the predetermined values respectively as the result of the number of revolutions of the given value or less. When it is determined at Step S76 that both the noise and the vibration are not the predetermined values or more (No), that is, both are less than the predetermined values, the control unit 22 ends the process without any change. When it is determined at Step S76 that at least one of the noise and the vibration is the predetermined value or more (Yes), the control unit 22 adjusts the output of the light source of the projector 34 as Step S78. In other words, the control unit 22 reduces the output of the light source of the projector 34 being a target to be cooled by the cooling fan 38, that is, a heat generating source. The reduction in the output of the heat generating source allows reduction in cooling performance of the cooling fan 38, which leads to reduction in the number of revolutions. This enables the noise and the vibration occurring at the cooling fan to be reduced. After adjusting the output of the light source at Step S78, the control unit 22 ends the process. In the flowchart of FIG. 7, during image projection from the projector 34, after the process is ended, the control unit 22 again starts the process at Step S70, and repeats the processes.

In this way, by adjusting the number of revolutions of the cooling fan 38 based on the vibration, it is possible to prevent the occurrence of the vibration of the given value or more in the housing 11, thus obtaining the same effect as that of the above mentioned embodiment. Furthermore, by adjusting the number of revolutions of the cooling fan 38 based on the noise, it is possible to change the noise produced from the mobile electronic device 10 to the given value or less, and the speech output during using the projector 34 can be set so as to be appropriately heard by persons around it.

In the flowchart illustrated in FIG. 7, both the noise and the vibration are detected, however, only the vibration may be detected. In addition, it may be configured that the sensor is not provided and the control is provided based on a relationship among the number of revolutions, the noise, and the vibration which are previously calculated. During the normal control, the control unit 22 may detect a temperature of the heat generating source by the temperature sensor and control the number of revolutions of the cooling fan based on the result of detection.

Figure 8:
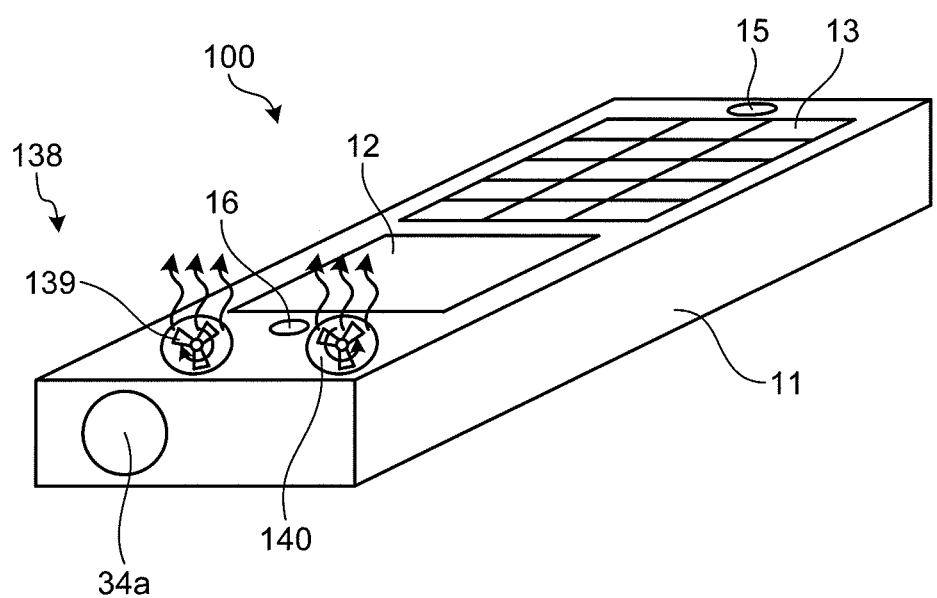
FIG. 8 is a perspective view illustrating a schematic configuration of another embodiment of the mobile electronic device.

In the embodiment, by controlling the number of revolutions of the cooling fan, the vibration of a predetermined value or more is prevented to occur, however, instead of this configuration, or in addition to this configuration, the configuration of the cooling fan may further be changed to a configuration in which the vibration is hard to be generated in the housing 11. For example, a plurality of cooling fans are provided, and arrangement positions of the cooling fans and rotation directions of the cooling fans may be adjusted so as to cancel out or to reduce rotational moments generated by the cooling fans in the housing 11. FIG. 8 is a perspective view illustrating a schematic configuration of another embodiment of the mobile electronic device. A mobile electronic device 100 illustrated in FIG. 8 is configured in the same manner as that of the mobile electronic device 10 except for that a cooling unit 138 is formed with a cooling fan 139 and a cooling fan 140, and therefore explanation thereof is omitted. The mobile electronic device 100 includes two cooling fans (the cooling fan 139 and the cooling fan 140) as the cooling unit 138. The cooling fan 139 and the cooling fan 140 rotate the blades mutually in the opposite direction to each other. The mobile electronic device 100 turns the rotation direction of the blades of the cooling fan 139 and the rotation direction of the blades of the cooling fan 140 in the opposite direction, and the rotational moments generated in the housing 11 can thereby be canceled out or reduced. In this manner, when the two cooling fans are provided as illustrated in FIG. 8, their rotation directions are turned to mutually different directions. In addition, when the housing 11 is placed on a support member, the cooling fans are provided in a direction in which the rotation axes of the cooling fans are orthogonal to the support. Moreover, when the housing 11 is placed on a support member, the cooling fans are provided so that wind emitted from the cooling fans is radiated in the vertical direction.

The present invention is not limited to the embodiments. For example, the embodiments may be combined with each other. In addition, the controls of the embodiments may be simultaneously provided, may be provided in combination, or may be switched to each other depending on use conditions. Moreover, the operator may select from among the control in the flowchart illustrated in FIG. 5 in which the projection is stopped and then the vibration is generated when the vibration reaches the predetermined value or more, the control in the flowchart illustrated in FIG. 6 in which a predetermined image is projected on a part (frame) of an image when the vibration reaches the predetermined value or more, and the control in the flowchart illustrated in FIG. 7 in which the radio wave is tuned off or the mode is switched to the silent mode when the image is projected. The embodiments exemplify the vibrator, the cooling fan, and the speaker as the vibration generator, however, the vibration generator is not limited thereto. The mobile electronic device according to the present invention may be configured to have all of the vibrator, the cooling fan, the speaker, and the other members, or may be configured to have one of the members.

Here, as an image projected by the projector 34, various images can be projected. For example, news information may be projected. If such news information is to be projected, it may be configured that the news information is automatically projected in response to reception thereof based on previous setting. In addition, an electronic book and a recipe may be projected. In this case, a page may be set to proceed to the next at each given time. In the case of a recipe, information for cooking time or the like is previously stored in software to be displayed, and a screen may be set so as to proceed to the next according to the cooking time.

Moreover, a clock, a countdown timer, or a stop watch may be projected. When it is combined with an alarm function, its projection may automatically be started from a several seconds before it is set in the alarm. The projection may be preformed so that it is combined with a snooze function of the alarm, and that the light amount of an image to be projected is getting larger or the image is getting brighter. Furthermore, when it is displayed in a blinking manner, a blinking period may be made faster.

When the mobile electronic device includes a 6-axis sensor capable of detecting geomagnetism, the result of detection by the 6-axis sensor may be used also during image projection from the projector 34. For example, it may be configured that geomagnetism is detected by the 6-axis sensor and a starry sky in a direction in which the projector 34 irradiates light is projected. In other words, the starry sky seen in that direction may be projected according to a time and a season. Likewise, a map may be projected according to the light irradiation direction.

As an example of the vibration generator, the vibrator to inform an incoming call and the cooling fan have been explained above, however, the example is not limited thereto. For example, the display unit of the mobile electronic device may be provided with a touch panel type display. Displayed in a specific area of the touch panel type display are buttons to indicate various operations, and the operator carries out an operation by touching a corresponding button. It is better that the vibration generator generates a vibration when any one of the buttons appearing in the display of the display unit is touched by the operator. It is better that the control unit 22 provides control so that the vibration generator vibrates when detecting a touch of the button. In this case, the vibrator to inform the incoming call can be diverted as the vibration generator.

INDUSTRIAL APPLICABILITY

As explained above, the mobile electronic device according to the present invention is suitable for using a mobile electronic device that projects an image from a projector, and is especially suitable for using a mobile phone.

| REFERENCE SIGNS LIST | |
|---|---|
| 10 | mobile electronic device |
| 11 | housing |
| 12 | display |
| 13 | operation keys |
| 15 | microphone |
| 16 | receiver |
| 22 | control unit |
| 24 | storage unit |
| 26 | transmitter/receiver |
| 26a | antenna |
| 28 | operating unit |
| 30 | speech processor |
| 32 | display unit |
| 34 | projector |
| 34a | light emitting portion |
| 36 | vibrator |
| 38 | cooling fan |

The invention claimed is:
1. A mobile electronic device, comprising:
an image projector configured to project an image;
a housing configured to accommodate the image projector;
a vibration generator configured to
generate a vibration to vibrate the housing, and adjust an intensity of the vibration; and
a control unit configured to control the image generator and the vibration generator, wherein
the control unit is configured to control the vibration generator to reduce the intensity of the vibration-while the image projector projects the image.

2. The mobile electronic device according to claim 1, wherein when the image projector is projecting an image, the control unit controls the vibration generator in such a way that the vibration generated by the vibration generator gets smaller than that of when the image projector does not project an image or the vibration generator does not generate the vibration.

3. The mobile electronic device according to claim 1, wherein when the image projector is projecting an image, the control unit changes the intensity of a vibration generated by the vibration generator to a predetermined value or less.

4. The mobile electronic device according to claim 3, wherein when the image projector is projecting the image and it is previously detected that the intensity of the vibration generated by the vibration generator reaches the predetermined value or more, the control unit causes the image projector to stop the projection of the image, and then causes the vibration generator to generate a vibration having the intensity of the predetermined value or more.

5. The mobile electronic device according to claim 3, wherein
the control unit controls the vibration of the vibration generator as a notification operation for notifying a predetermined state, and wherein
when the image projector is projecting the image and it is previously detected that the intensity of the vibration generated by the vibration generator reaches the predetermined value or more, the control unit controls a notification operation different from the notification operation due to the vibration.

6. The mobile electronic device according to claim 1, wherein when the vibration is suppressed, the control unit causes the image projector to project a previously set image for notification.

7. The mobile electronic device according to claim 5, further comprising a transmitter/receiver that performs communication with other terminal, wherein
the vibration generator vibrates the housing in order to notify an incoming call to the transmitter/receiver from the other terminal.

8. The mobile electronic device according to claim 7, wherein when the image projector is projecting the image, the control unit stops transmission and reception of information by the transmitter/receiver.

9. The mobile electronic device according to claim 1, wherein the vibration generator includes a cooling fan, and the vibration generator generates the vibration by rotating the cooling fan.

10. The mobile electronic device according to claim 9, wherein when the image projector is projecting the image, the control unit reduces the number of revolutions of the cooling fan.

11. The mobile electronic device according to claim 1, wherein the vibration generator includes a speaker, and the vibration generator generates the vibration by driving the speaker.

12. The mobile electronic device according to claim 1, wherein the control unit calculates the intensity of the vibration generated in the housing based on information for an operation executed by the vibration generator.

13. The mobile electronic device according to claim 1, further comprising a vibration detector that detects a vibration occurring in the housing, wherein
the control unit calculates the intensity of the vibration occurring in the housing based on a result of detection by the vibration detector.

14. The mobile electronic device according to claim 1, further comprising a display unit using a touch panel type display, wherein
when a touch to the display is detected,
the control unit causes the vibration generator to vibrate the housing.

15. A mobile electronic device, comprising:
an image projector that projects an image;
a housing that holds the image projector;
a vibration generator that vibrates the housing, the vibration generator being capable of adjusting intensity of the vibration; and
a control unit that suppresses the vibration according to projection by the image projector, wherein
when the image projector projects is projecting an image, the control unit controls the vibration generator in such a way that the vibration generated by the vibration generator gets smaller than that of when the image projector does not project an image or the vibration generator does not generate the vibration.

16. A mobile electronic device, comprising:
an image projector that projects an image;
a housing that holds the image projector;
a vibration generator that vibrates the housing, the vibration generator being capable of adjusting intensity of the vibration; and
a control unit that suppresses the vibration according to projection by the image projector, wherein
when the image projector is projecting the image and it is previously detected that the intensity of the vibration generated by the vibration generator reaches the predetermined value or more, the control unit causes the image projector to stop the projection of the image, and then causes the vibration generator to generate a vibration having the intensity of the predetermined value or more.

17. A mobile electronic device, comprising:
an image projector that projects an image;
a housing that holds the image projector;
a vibration generator that vibrates the housing, the vibration generator being capable of adjusting intensity of the vibration; and
a control unit that suppresses the vibration according to projection by the image projector, wherein
the control unit calculates the intensity of the vibration generated in the housing based on information for an operation executed by the vibration generator.

18. A mobile electronic device, comprising:
an image projector configured to project an image;
a vibration generating unit configured to
generate a vibration, and
adjust an intensity of the vibration; and
a control unit configured to control the vibration generator, wherein
the control unit is configured to control the vibration generator to adjust the intensity of the vibration based on an image projecting status of the image projector.

* * * * *